United States Patent Office
3,461,164
Patented Aug. 12, 1969

3,461,164
1-HYDROXY-2-AMINO-1-PHENYL-ALKANES
AND THE SALTS THEREOF
Karl Schulte and Wolfgang Fruhstorfer, Darmstadt, Heinrich Muller, Pfungstadt, Hans Friebel, Darmstadt-Eberstadt, Hans Joachim Enenkel, Darmstadt, and Josef Gillissen, Eschollbrucken, Germany, assignors to E. Merck Aktiengesellschaft, Darmstadt, Germany
No Drawing. Filed Apr. 27, 1964, Ser. No. 364,355
Claims priority, application Germany, Apr. 25, 1963, M 56,597; May 25, 1963, M 56,960
Int. Cl. C07c 91/18
U.S. Cl. 260—570.6            22 Claims This invention relates to substituted 1-hydroxy-2-amino-1-phenyl-alkanes.

It is a principal object of this invention to provide novel and unobvious chemical compounds.

Another object is to provide processes for the production of these compounds.

A further object is to provide novel pharmaceutical compositions, and still another object is to provide novel processes for effecting therapeutic activities in mammals.

Upon further study of the specification and claims other objects and advantages of the present invention will become apparent.

To attain the objects of this invention, there are provided the following compounds and acid-addition salts thereof, said compounds having the formula I

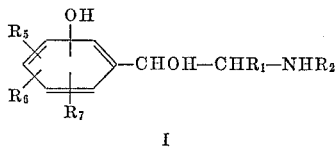

I wherein $R_1$ represents hydrogen or alkyl of 1–4 carbon atoms,
$R_2$ represents any of hydrogen, alkyl of 1–6 carbon atoms, hydroxyalkyl of 2–3 carbon atoms, phenoxyalkyl of 7–11 carbon atoms, or a radical of the formula

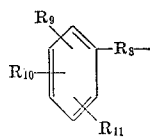

wherein $R_8$ represents alkyl of 1 to 5 carbon atoms,
$R_9$, $R_{10}$ and $R_{11}$ are each any of hydrogen, hydroxy, methoxy, ethoxy, or two of $R_9$, $R_{10}$ and $R_{11}$ forming methylene dioxy,
$R_5$ represents a tertiary alkyl of 4–6 carbon atoms; and
$R_6$ and $R_7$ are each any of hydrogen, methyl or ethyl.

The compounds of Formula I which are especially therapeutically efficacious are those in which the phenyl group is substituted by a hydroxyl group and at least 2 alkyl groups of which one is tertiary. Preferably, for that purpose are ethanolamine derivations which have one of the following groups—3'-tert.butyl-4'-hydroxy-5'-methyl-phenyl,4'-tert.butyl-3'-hydroxy-phenyl and 4'-tert.butyl-3'-hydroxy-2',6'-dimethyl-phenyl.

The group $R_1$ is preferably hydrogen, methyl, ethyl, n-propyl, isopropyl, n-butyl, sec. butyl, isobutyl or tert. butyl. The group $R_2$ in the end-product, besides hydrogen, is preferably any of methyl, ethyl, n-propyl, isopropyl, n-butyl, sec.butyl, isobutyl, tert.butyl, n-amyl, isoamyl, neopentyl, n-hexyl, isohexyl, benzyl, 1-phenylethyl, 2-phenylethyl, 3-phenylpropyl-(1), 4-phenylbutyl-(1), 4-phenylbutyl-(2), 2-hydroxyethyl, 3-hydroxypropyl, phenoxymethyl, 1-phenoxyethyl, 2-phenoxyethyl, 1-phenoxypropyl-(1), 1-phenoxypropyl-(2), o-, m- or p-hydroxybenzyl, o-, m- or p-methoxybenzyl, o-, m- or p-ethoxybenzyl, 3,4-dihydroxybenzyl, 3,4-dimethoxybenzyl, 3,4,5-trihydroxybenzyl, 3,4,5-trimethoxybenzyl or 3,4-methylendioxybenzyl.

Particularly preferred compounds are:

N-[1-(3'-tert.butyl-4'-hydroxy-5'-methyl-phenyl)-1-hydroxy-butyl-2]-N-isopropylamine
N-[1-(3'-tert.butyl-4'-hydroxy-5'-methyl-phenyl)-1-hydroxy-propyl-2]-N-methylamine
N-[1-(3'-tert.butyl-4'-hydroxy-5'-methyl-phenyl)-1-hydroxy-propyl-2]-N-ethylamine
N-[1-(3'-tert.butyl-4'-hydroxy-5'-methyl-phenyl)-1-hydroxy-propyl-2]-N-isopropylamine
N-[1-(3'-tert.butyl-4'-hydroxy-5'-methyl-phenyl)-1-hydroxy-propyl-2]-N-(4-phenyl-butyl-2)-amine
N-[1-(3'-tert.butyl-4'-hydroxy-5'-methyl-phenyl)-1-hydroxy-propyl-2]-N-(1-phenoxy-propyl-2)-amine
N-[2-(3'-tert.butyl-4'-hydroxy-5'-methyl-phenyl)-2-hydroxy-ethyl]-N-methylamine
N-[2-(3'-tert.butyl-4'-hydroxy-5'-methyl-phenyl)-2-hydroxy-ethyl]-N-isopropylamine
N-[2-(3'-tert.butyl-4'-hydroxy-5'-methyl-phenyl)-2-hydroxy-ethyl]-N-(4-phenyl-butyl-2)-amine
N-[2-(3'-tert.butyl-4'-hydroxy-5'-methyl-phenyl)-2-hydroxy-ethyl]-N-(1-phenoxy-propyl-2)-amine
N-[1-(4'-tert.butyl-3'-hydroxy-phenyl)-1-hydroxy-propyl-2]-N-methylamine
N-[1-(4'-tert.butyl-3'-hydroxy-phenyl)-1-hydroxy-propyl-2]-N-isopropylamine
N-[2-(4'-tert.butyl-3'-hydroxy-2',6'-dimethyl-phenyl)-2-hydroxy-ethyl]-N-methylamine
N-[1-(4'-tert.butyl-3'-hydroxy-2',6'-dimethyl-phenyl)-1-hydroxy-propyl-2]-N-methylamine
N-[2-(4'-tert.butyl-3'-hydroxy-2',6'-dimethyl-phenyl)-2-hydroxy-ethyl]-N-isopropylamine
N-[1-(4'-tert.butyl-3'-hydroxy-2',6'-dimethyl-phenyl)-1-hydroxy-propyl-2]-N-isopropylamine
2-(3'-tert.butyl-4'-hydroxy-5'-methyl-phenyl)-2-hydroxy-ethylamine
1-(3'-tert.butyl-4'-hydroxy-5'-methyl-phenyl)-1-hydroxy-2-aminopropane.

With respect to the tertiary alkyl group $R_5$ it should be noted that generally the tertiary carbon atom is the carbon atom which is joined to the benzene nucleus.

According to this invention the compounds of Formula I can be produced by any one of the following processes:

(a) A reducing agent is reacted with a compound of Formula II

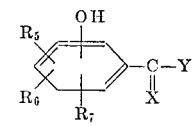

wherein $R_5$, $R_6$, and $R_7$ have the previously indicated meanings, and wherein
X is =O or H, OH and
Y is —$CHR_1$—$NHR_2$ or a group that can be converted into the latter by reaction, and where
$R_1$ and $R_2$ have the meanings already stated and also where instead of the hydrogen atoms there can be hydrogenolytically removable groups; but where when X is H, OH, Y can be —$CHR_1NHR_2$— simultaneously only when at least one hydrogenolytically removable group is present.

Groups which can be converted by reduction into the group CHR$_1$—NHR$_2$ are for example the following: —CR$_1$=NOH (which may be esterified, preferably with an alkane-carboxylic acid with up to 4 carbon atoms, e.g. acetic acid), —CHR$_1$—N$_3$, CN, —CHR$_1$—NO$_2$, —CHR$_1$—NH—NH$_2$ (where one or both of the H-atoms of the terminal N-atom can be optionally substituted by lower alkyl or aryl groups, preferably by methyl, ethyl or phenyl),
—CR$_1$=N—NH$_2$
(also optionally substituted by a lower alkyl or aryl group, Preferably by a methyl, ethyl or phenyl group), —CO—NH$_2$, —CR$_1$—N=R′, —CHR$_1$—NH—R′—OH, —CHR$_1$—NH-acyl.

In the above groups R$_1$ and R$_2$ have the meanings previously given and R′ is an alkylidene, aralkylidene, hydroxy-alkylidene or phenoxy-alkylidene group.

R′ can thus e.g. be methylene, ethylidene, propylidene, isopropylidene, butylidene-1, butylidene-2, 2-phenylethylidene, 4-phenyl-butylidene-2, 1-phenoxypropylidene-2.

Suitable hydrogenolytically removable groups are e.g. N-benzal-, O- or N-benzyl-, substituted O- or N-benzyl and carbobenzoxy-groups, also nitroso-, amino- or arylsulfonyl groups attached to amino groups, and/or halogen atoms preferably aromatic nuclei.

Suitable starting substances for process (a) are preferably the following—

α-benzylamino-3-tert.butyl-4-hydroxy-5-methyl-
acetophenone,
-propiophenone,
-butyrophenone,
-isobutyrophenone,
-valerophenone and -isovalerophenone,
α-benzylamino-4-tert.butyl-3-hydroxy-
acetophenone,
α-benzylamino-4-tert.butyl-3-benzyloxy-acetophenone,
α-azido-3-tert.butyl-4-hydroxy-5-methyl-acetophenone,
-propiophenone,
-butyrophenone,
-isobutyrophenone,
-valerophenone and -isovalerophenone,
α-azido-4-tert.butyl-3-hydroxy-acetophenone and
-propiophenone,
α-azido-4-tert.butyl-3-benzyloxy-acetophenone and
-propiophenone,
α-isonitroso-3-tert.butyl-4-hydroxy-5-methyl-
acetopenone,
-propiophenone and butyrophenone,
2-benzylamino-1-(3′-tert.butyl-4′-hydroxy-5′-methyl-
phenyl)-butanol-(1),
4-tert.butyl-3-hydroxy-benzaldehyde cyanhydrin,
α-benzylamino-4-tert.butyl-3-hydroxy-2,6-dimethyl-
acetophenone and
-propiophenone,
α-benzylamino-4-tert.amyl-3-hydroxy-2,6-
dimethyl-acetophenone and
-propiophenone,
α-benzylamino-4-(3′-methylpentyl-3′)-3-hydroxy-
2,6-dimethylacetophenone and
-propiophenone,
α-benzylamino-4-tert.butyl-3-hydroxy-2,6-
dimethylbutyrophenone,
α-amino-4-tert.butyl-3-hydroxy-2,6-dimethyl-
propiophenone,
α-amino-4-tert.amyl-3-hydroxy-2,6-
dimethylpropiophenone,
2-benzylamino-1-(4′-tert.butyl-3′-hydroxy-2′,6,-
dimethyl-phenyl)-butanol-(1).
α-azido-4-tert.butyl-3-hydroxy-2,6-
dimethylacetophenone,
-propiophenone and -butyrophenone,
α-azido-4-tert.amyl-3-hydroxy-2,6-dimethyl-
propiophenone,
α-benzylamino-3-benzyloxy-4-tert.butyl-2,6-
dimethyl-acetophenone,
α-(N-benzyl-N-methylamino)-3-tert.butyl-4-
hydroxy-5-methyl-acetophenone,
-propiophenone,
-butyrophenone,
-isobutyrophenone,
-valerophenone and -isovalerophenone,
α-(N-benzyl-N-ethylamino)-3-tert.butyl-4-hydroxy-5-
methyl-acetophenone,
propiophenone,
-butyrophenone,
-isobutyrophenone,
-valerophenone and -isovalerophenone,
α-(N-benzyl-N-methylamino)-4-tert.butyl-3-hydroxy-
acetophenone,
-propiophenone and -butyrophenone,
α-(N-benzyl-N-isopropylamino)-4-tert.butyl-3-hydroxy-
acetophenone,
-propiophenone and -butyrophenone,
α-(N-benzyl-N-methylamino)-4-tert.butyl-3-benzyloxy-
acetophenone,
-propiophenone and -butyrophenone,
α-methylamino-3-tert.butyl-4-hydroxy-5-methyl-
acetophenone,
-propiophenone,
-butyrophenone,
-isobutyrophenone,
-valerophenone and -isovalerophenone,
α-ethylamino-3-tert.butyl-4-hydroxy-5-methyl-aceto-
phenone,
-propiophenone,
-butyrophenone,
-isobutyrophenone,
-valerophenone and -isovalerophenone,
α-isopropylamino-3-tert.butyl-4-hydroxy-5-methyl-aceto-
phenone,
-propiophenone,
-butyrophenone,
-isobutyrophenone,
-valerophenone and -isovalerophenone,
α-propylamino-3-tert.butyl-4-hydroxy-5-methyl-aceto-
phenone,
-propiophenone,
-butyrophenone,
-isobutyrophenone,
-valerophenone and -isovalerophenone,
α-isobutylamino-3-tert.butyl-4-hydroxy-5-methyl-aceto-
phenone,
-propiophenone,
-butyrophenone,
-isobutyrophenone,
-valerophenone and -isovalerophenone,
α-sec. butylamino-3-tert.butyl-4-hydroxy-5-methyl-aceto-
phenone,
-propiophenone,
-butyrophenone,
-isobutyrophenone,
-valerophenone and -isovalerophenone,
α-tert.butylamino-3-tert.butyl-4-hydroxy-5-methyl-aceto-
phenone,
-propiophenone,
-butyrophenone,
-isobutyrophenone,
-valerophenone and -isovalerophenone,
α-butylamino-3-tert.butyl-4-hydroxy-5-methyl-aceto-
phenone,
-propiophenone,
-butyrophenone,
-isobutyrophenone,
-valerophenone and -isovalerophenone,
α-(4-phenylbutyl-2-amino)-3-tert.butyl-4-hydroxy-5-
methyl-acetophenone,
-propiophenone, -butyrophenone,
-isobutyrophenone,
-valerophenone and -isovalerophenone,
α-(1-phenoxy-propyl-2-amino)-3-tert.butyl-4-hydroxy-5-methylacetophenone,
propiophenone,
-butyrophenone,
-isobutyrophenone,
-valerophenone and isovalerophenone,
α-methylamino-4-tert.butyl-3-hydroxy-2,6-dimethyl-acetophenone,
-propiophenone and -butyrophenone,
-α(N-benzyl-N-methyl-amino)-4-tert.butyl-3-hydroxy-2,6-dimethyl-acetophenone,
-propiophenone and butyrophenone,
α-ethylamino-4-tert.butyl-3-hydroxy-2,6-dimethyl-acetophenone,
-propiophenone and -butyrophenone,
α-(N-benzyl-N-ethylamino)-4-tert.butyl-3-hydroxy-2,6-dimethyl-acetophenone,
-propiophenone and -butyrophenone,
α-isopropylamino-4-tert.butyl-3-hydroxy-2,6-dimethyl-acetophenone,
-propiophenone and -butyrophenone,
α-(N-benzyl-N-isopropylamino)-4-tert.butyl-3-hydroxy-2,6-dimethyl-acetophenone,
-propiophenone and -butyrophenone,
N-[2-3'-benzyloxy-4'-tert.butyl-2',6'-dimethyl-phenyl)-2-hydroxy-ethyl]-N-methyl- and N-isopropylamine,
N-[1-(3'-benzyloxy-4'-tert.butyl-2',6'-dimethyl-phenyl)-1-hydroxy-propyl-2]-N-methyl- and N-isopropylamine,
1-(4'-tert.butyl-3'-hydroxy-2',6'-dimethyl-phenyl)-1-hydroxy-2-isopropylidene-amino)-ethane, -propane and butane.

A compound of Formula II can e.g. be converted into a compound of Formula I by treatment with catalytically activated hydrogen. The usual catalysts such as the noble metal catalysts, copper-chromium-oxide, as well as nickel and cobalt, are suitable for this purpose. The noble metal catalysts can be incorporated in the carrier, e.g. catalysts such as palladium on charcoal, oxidation catalysts, or finely divided metal catalysts. Nickel and cobalt are advantageously used as Raney metals, nickel being also used on kieselguhr or pumice as a carrier.

Depending on the composition of the starting material, the hydrogenation is performed under normal conditions or under increased pressure and/or elevated temperature. It is also advantageous to perform the reaction in the presence of a solvent such as methanol, ethanol, isopropanol, tert. butanol, ethyl acetate, dioxane, tetrahydrofuran, water, an aqueous inorganic acid or an alkaline lye. For the specific choice of the solvent the composition of the starting material should, of course, be taken into consideration.

The reaction can, in principle, be performed in either an acid, a neutral or a basic medium. For those compounds of Formula II which have a C=N double bond, a neutral or basic medium is preferred. If a compound of Formula II with a basic nitrogen atom is to be hydrogenated, either the free base or a salt of it can be used. For example, the hydrochloride can be hydrogenated in water under normal conditions. If e.g. a compound of the general Formula II with X as =O and Y as —CHR₁NR₂-benzyl is used as the starting material, the hydrogenation for producing the desired ethanolamine can be performed in one operation with palladium on charcoal. It is also possible, however, to first split off only the hydrogenolytically removable group (here the benzyl group) e.g. in the presence of the palladium catalyst, and then after separation from the catalyst but without isolation of the amino-ketone, reduce the keto-group of the latter to a secondary alcohol. On the other hand, it is also possible to first reduce the keto-group e.g. with lithium tetrahydrogen aluminate and then without isolating the reduction product to split off the hydrogenolytically removable group.

If oximes (isonitrosoketones) are used as the starting materials, a hydrogenation can be performed advantageously with Raney-nickel in dilute alkaline lye, or with noble metals in acid solution. Azides are advantageously hydrogenated with noble metal catalysts in strongly acid alcoholic solution until the calculated amount of hydrogen has been taken up, while nitriles are hydrogenated above pH 7 with Raney-nickel, but with noble metal catalysts in the acid range.

It is generally possible to use nascent hydrogen for reduction purposes. This can be produced e.g. with zinc and acid or alkaline lye, or wtih iron and hydrochloric or acetic acid. Sodium or some other alkali metal can also be advantageously used with ethanol, isopropanol or butanol. It is also possible to use an aluminum nickel alloy in aqueous alkaline solution, with the possible addition of alcohol. Sodium or aluminum amalgam in aqueous alcoholic or aqueous solution is also suitable. With these reactions the work is preferably done in the presence of a solvent such as methanol, ethanol, glacial acetic acid, benzene, toluene or water.

The reaction can also be performed in a heterogeneous phase with reaction temperatures ranging from room temperature to the boiling point of the solvent. It is generally not necessary to work under pressure. The reaction is advantageously brought to an end by boiling the reaction mixture under reflux.

A reducing agent that is especially suitable for the reduction of a nitro compound or an azide is hydrogen sulfide which can be used in an acid, neutral or alkaline medium. The hydrogen sulfide is generally not used as such, but rather as alkali or ammonium sulfide or polysulfide.

The starting compounds of Formula II can also be converted by electrochemical methods into amines of Formula I. For that purpose an aqueous acid reaction solution is used, which may contain an additional solvent such as glacial acetic acid or alcohol. The cathodic reduction can be performed with the use of a lead, copper, nickel or carbon electrode.

As reducing agents, use can also be made of complex metal hydrides such as lithium-tetrahydrogen-aluminate, sodium-tetrahydrogen-borate, or aluminum-tetrahydrogen-borate. As starting materials for these reduction methods, oxo-compounds of Formula II (X=O), acylated amines, nitro-compounds or azides, nitriles, oximes or imines are especially suitable. The reaction is performed under the usual conditions, and preferably in the presence of an inert solvent, e.g. ether, tetrahydrofuran, methanol, and on occasions also in the presence of water. The reaction is advantageously terminated by heating the reaction mixture to the boiling temperature of the solvent. The metal complexes that are formed can be decomposed in the usual manner, e.g. with aqueous ammonium chloride solution.

For the reduction of a nitro-compound or a corresponding azide, preferred reducing agents are alkali dithionates or alkaline suspensions of iron (II) hydroxide. Hydrazine or hydrazine hydrate can also be used advantageously as a reducing agent in some cases.

All the usual reduction methods are theoretically applicable, the selection being based only on the starting material that is used, such methods being described in Houben Weyl, "Methoden der organischen Chemie," 4th edition, Verlag Georg Thieme, Stuttgart, 1957, vol. 11/1, Stickstoffverbindungen II, pages 341 to 731.

(b) It is also possible to convert a compound of Formula III

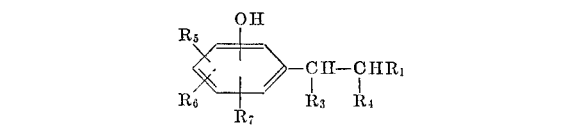

wherein

R₁, R₅, R and R₇ have the previously indicated meaning,
R₃ is a hydroxyl group, and
R₄ is chlorine or bromine or
R₃ and R₄ together represent an oxygen atom.

by treatment with an amine of the formula R₂—NH₂ wherein R₂ has the meaning previously given, or with a compound that produces such an amine, into a compound of Formula I.

Preferred starting compounds for process (b) are 2-chloro- or 2-bromo-1-(3'-tert.butyl-4'-hydroxy-5'-methyl-phenyl)-1-hydroxyethane, 2-chloro- or 2-bromo-1-(3'-tert.butyl - 4' - hydroxy-5'-methyl-phenyl)-1-hydroxypropane, 2-chloro- or 2-bromo-1-(4'-tert.butyl-3'-hydroxy-phenyl)-1-hydroxy-ethane, 2-chloro- or 2-bromo-1-(4'-tert.butyl-3'-hydroxy-phenyl)-1-hydroxypropane.

As ammonia-producing substances, consideration should be given e.g. to hexamethylene-tetramine, ammonium carbonate, ammonium bicarbonate or ammonium carbamate. The reaction acn be performed in the presence or in the absence of a solvent. Use can be made e.g. of lower aliphatic alcohols such as methanol, ethanol or isopropanol, or lower aliphatic ketones such as acetone or butanone, or of benzene, toluene, acetonitrile or mixtures thereof as solvents. The work can be done at different temperatures depending on the starting substance that is used, ranging preferably from room temperature to the boiling point of the solvent that is used. The reaction can also be performed in an excess of the primary amine which would then function as a solvent. For a more rapid reaction, the work can be performed under pressure and/or at higher temperatures, the ammonia or the primary amine, in such cases, being preferably in excess. This method is especially advantageous if epoxides (Formula III, R₃ and R₄ together representing an oxygen atom) are used as starting compounds. The reaction conditions can be chosen as described in Houben Weyl, loc. cit., pages 314-326. If R₄ is a halogen, the methods described in Houben Weyl, loc. cit. pages 24-108 can be used.

It is also possible to perform the reduction described under (a) simultaneously with the amination under (b). For example, suitably substituted phenyl-glyoxals or phenyl-alkyl-diketones can be hydrogenated in the presence of ammonia or a primary amine with the preferred use of platinum, palladium or Raney-nickel as a catalyst, whereby the desired amino-alcohols are produced. The work is done under the usual conditions (see e.g. loc. cit. pages 646-648).

(c) Compounds of Formula I can also be produced by starting with a compound having the same general structure as Formula I and whose phenyl group or whose side chain contains one or two functionally altered hydroxal groups and/or whose amino group is present in a functionably altered form, or which instead of the group —CHOH—CHNHR₂ contains the group

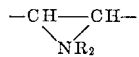

and liberating the hydroxyl and/or amino group or groups by hydrolysis, alcoholysis or aminolysis, or by splitting open the imino ring by hydrolysis.

The functionally altered hydroxyl groups can be e.g. acyloxy- or other ester-groups such as chloride, bromide or alkoxy-groups. The functionally altered amino groups can e.g. be acylated or can be present as isocyanate-, arylsulfonamino- or nitrosamino-groups. The isocyanate derivatives are obtained by the known decomposition reactions of the corresponding carboxylic acids. Information about such decomposition processes will be found in the publications of Hofmann, Curtius, Lossen and Schmidt. The reaction conditions for the production of compounds of Formula I are not different from those described in the literature.

A special case is the hydrolytic splitting of phthalimido compounds such as are obtained by the method of Gabriel (see loc. cit. pages 80-95).

As starting materials for process (c), any one of the following compounds can be used—

2-amino-1-(3-tert.butyl-4'-acetoxy-5'-methyl-phenyl)-1-hydroxy-ethane,
2-amino-1-(3'-tert.butyl-4'-propionyloxy-5'-methyl-phenyl)-1-hydroxy-propane,
2-amino-1-(4'-tert.butyl-3'-benzyloxy-phenyl)-1-hydroxy-ethane and -propane,
2-amino-1-(3'-acetoxy-4'-tert.butyl-2',6'-dimethyl-phenyl)-1-hydroxy-ethane,
2-acetylamino-1-(3'-acetoxy-4'-tert.butyl-2-',6'-dimethyl-phenyl)-1-hydroxy-ethane,
2-acetylamino-1-(4'-tert.butyl-3'-hydroxy-2',6'-dimethyl-phenyl)-1-hydroxy-ethane,
2-methylamino-, 2-ethylamino- and 2-isopropylamino-1-(3'-tert.butyl-4'-acetoxy-5'-methyl-phenyl)-1-hydroxy-ethane,
2-methylamino-, 2-ethylamino and 2-isopropylamino-1-(3-tert.butyl-4'-propionyloxy-5'-methyl-phenyl)-1-hydroxy-propane,
2-methylamino-1-(3'-acetoxy-4'-tert.butyl-2',6'-dimethyl-phenyl)-1-hydroxy-ethane and -propane.
2-ethylamino and 2-isopropylamino-1-(3'-acetoxy-4'-tert.butyl-2'-dimethyl-phenyl)-1-hydroxy-ethane.

In accordance with process (c), the starting compound is subjected to an initial hydrolysis whereby the hydroxyl and/or amino groups are set free. The hydrolysis can be performed in an acid or alkaline medium. The work is done preferably in an aqueous or alcoholic medium at the boiling temperature of the solvent. If ether groups have to be hydrolyzed, then the conditions must be more drastic. In any case, the work is preferably done in e.g. concentrated aqueous hydrohalide solution and at elevated temperature. For splitting ether groups, use can also be made of sodium amide in liquid ammonia. An acylated amino group of an amine of Formula I can be set free by alcoholysis by treatment of such a compound with a lower aliphatic alcohol in the presence of hydrogen chloride, or by aminolysis by treatment of the starting material in an autoclave with ammonia or an amine, e.g. methyl- or ethylamine. The amine or ammonia that is used serves also as a solvent and must therefore be present in great excess. Reaction temperatures up to 250° C. are used. For splitting acyl amines, the methods described in Houben Weyl, loc. cit. pages 926-936 and 939-948 can be used.

By process (c) it is also possible to hydrolytically split suitably substituted phenyl ethylene imines.

(d) Compounds of Formula I can also be obtained by introducing into a compound of Formula IV

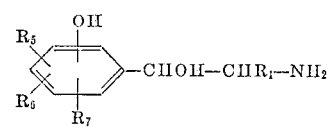

wherein R₁, R₅, R₆ and R₇ have the previously indicated meanings.

The group R₂ is introduced by means of a known alkylation process, which must be done under conditions where a simultaneous etherification of the phenolic and/or alcoholic hydroxyl group or groups would be avoided.

For example, the compounds of the general Formula IV can be converted in the usual manner into compounds substaituted on the nitrogen atom with alkyl-, aralkyl- or phenoxy-alkyl esters of inorganic acids such as e.g. hydrohalide acids, sulfuric acid, phosphoric acid or organic sulfonic acids such as e.g. p-toluene sulfonic acid, or with ethylene or propylene oxide. The compounds of Formula IV can also be condensed with aldehydes or ketones to form aldehyde ammonias or Schiff bases, these being then hydrogenated as under (a) or are treated with an alkylating agent and then hydrolyzed. The alkylation of the amino group can e.g. be accomplished by condensation with benzaldehyde to a Schiff base and treatment of the condensation product with alkyl halides as e.g. methyl chloride, methyl bromide, methyl iodide, ethyl bromide or isopropyl bromide. Here the quaternary salt is first formed, which in the subsequent reaction e.g. by treatment with acids such as hydrochloric acid is converted into the secondary amine. The new compounds under Formula I can also be obtained by reacting an amine of Formula IV with an aldehyde in the presence of formic acid. It is also possible, with good results, to react an amine of Formula IV with an alcohol in the presence of lithium-tetrahydrogen aluminate as under (a).

The methods described in Houben Weyl, vol. 11/1 for the alkylation of primary amines can generally be used, provided one or more of the hydroxyl groups already present in the molecule are not etherized.

Finally an amine of Formula I that may be formed by the process of this invention can be converted into a physiologically compatible acid addition salt by treatment with acids. Suitable acids for this purpose are inorganic or organic, e.g. aliphatic, alicyclic, araliphatic, aromatic or heterocyclic mono- or polybasic acids. It is advantageous to use the following acids—mineral acids such as hydrochloric, hydrobromic, sulfuric, nitric or orthophosphoric acid, or organic acids such as acetic acid, propionic acid, 1-ascorbic acid, succinic acid, citric acid, gluconic acid, lactic acid, methane-sulfonic acid, $\beta$-hydroxyethane-sulfonic acid, maleic acid, fumaric acid, tartaric acid, malic acid, benzoic acid, salicylic acid, naphthalene disulfonic acid, pivalic acid, ethane-disulfonic acid, p-toluene-sulfonic acid. Preferred salts are the hydrochlorides, hydrobromides, sulfates, maleates, fumarates, citrates and tartrates.

Conversely, it is also possible by means of a base to liberate the amine from an acid addition salt of a secondary amine of Formula I.

It is to be noted that the compounds of this invention have one asymmetric carbon atom, or two if $R_1$ is an alkyl group. By their synthesis they are produced as racemic mixtures which can be separated into their optically active components by known methods of treatment with optically active acids, e.g. tartaric, camphor sulfonic, mandelic, malic, or lactic acid. Such a separation can generally be accomplished by the methods described in Houben Weyl, loc. cit vol. 4/2, pages 513–519. Compounds with $R_1$=alkyl exist in two racemic forms erythro- and threo-forms). According to their method of production, the one or the other of these forms will predominate. In many cases only the more abundant of the two forms will be separated. In other cases where both forms are obtained, their separation can be accomplished in the usual manner e.g., by distillation, crystallization of the free bases or of suitable salts, chromatography, or combinations of these methods. It is also possible to first separate a starting compound of Formula II which has only one asymmetric carbon atom, e.g. an amino ketone, into its active components, and then to reduce one or both of these to produce optically active final products of Formula I.

The new compounds of this invention have very valuable pharmacological properties. Upon administration to mammals, there is, in general, effected a sympathicomimetic activity which makes them useful as drugs to increase the blood pressure.

In addition, a circulation-stabilizing activity is obtained by administering certain compounds of this inventon. Some of these compounds yield prolonged activities in uniformly increasing blood pressure.

Additionally, by administering certain compounds of this invention, there is effectively achieved a preventive activity against circulation failure, thereby reducing the danger of collapse.

A further effect of some compounds of this invention is a prolonged bronchospasmolytic action.

A still further effect of certain compounds of this invention is that they are suitable for local treatment of excess blood-containing skin and sections of mucuous membranes, or for use as vasoconstrictors, with or without the addition of local anaesthetic and other medicinal agents.

Lastly, it has been observed that many of the compounds of this invention stimulate the central nervous system e.g. they show anorectic, analeptic, and central sympathicomimetic effects.

The sympathicomimetic effects of the new compounds were observed by administering appropriate doses to anesthesized rats and dogs. The tests were conducted according to the usual methods and evaluated according to standard procedures.

In comparison with known substances, and especially in comparison with other circulatory- and bronchialspasmolytically active substances with analogous action, the new compounds are characterized by higher stability, oral effectiveness, absence of tachyphylaxis, prolonged activity and excellent therapeutic index.

The new compounds can be employed in admixture with the usual pharmaceutical carriers. Consideration should be given to those organic and inorganic carrier substances which are suitable for parenteral, enteral or topical application and which do not enter into reaction with the new compounds, as for example water, vegetable oils, polyethylene glycol, gelatin, lactose, starch, magnesium stearate, talc, vaseline, cholesterol, etc. For parenteral application solutions are especially suitable, preferably oily or watery solutions, as well as emulsions or implants. For enteral application, tablets and dragees can also be used, while for topical application use can be made of salves or cremes, which may be sterilized if necessary, or mixed with ancillary substances such as preservatives, stabilizers, wetting agents, salts for influencing the osmotic pressure, or buffer substances.

The new compounds are preferably incorporated in unit dosages of 0.01 to 100 mg., and effective amounts are administered. Preferred pharmaceutical preparations are tablets, coated tablets, drops and injection solutions.

EXAMPLES FOR PHARMACEUTICAL PREPARATIONS

I.—Tablets

Each tablet contains:

| | Mg. |
|---|---|
| N-[1-(3'-tert.butyl-4'-hydroxy-5'-methyl-phenyl)-1-hydroxypropyl-2]-N-methylamine hydrochloride | 1 |
| Lactose | 2 |
| Potato starch | 1 |
| Talic | 0.5 |
| Magnesium stearate | 0.02 |

II.—Injection solution

Each ampoule contains 1 mg. of N-[1-(3'-tert.butyl-4' - hydroxy - 5'-methyl-phenyl)-1-hydroxypropyl-2]-N-ethylamine hydrochloride in 5 ml. of distilled, pyrogen-free water.

III.—Drops 5 g. N-[1-(3'-tert.butyl-4'-hydroxy-5'-methyl-phenyl)-1-hydroxybutyl-2] - N-isopropylamine hydrochloride are dissolved in 5 l. of distilled water. The solution is stabilized by addition of a preserving agent and filled into appropriate bottles. The average dosage to be administered is 20 drops (about 1 mg. of the active ingredient).

IV.—Tablets

Each tablet contains:

| | Mg. |
|---|---|
| 2 - (4'-tert.butyl-3'-hydroxy-2',6'-dimethyl-phenyl)-2-hydroxy-ethylamine hydrochloride | 1.5 |
| Lactose | 3 |
| Corn starch | 1.5 |
| Talc | 0.3 |

Without further elaboration, it is believed that one skilled in the art can, using the preceding description, utilize the present invention to its fullest extent. The following preferred specific embodiments are, therefore, to be construed as merely illustrative, and not limitative of the remainder of the specification in any way whatsoever.

EXAMPLE 1

137 g. α-(N-benzyl-N-methylamino)-3-tert.butyl-4-hydroxy-5-methyl-propionophenone are dissolved in 3 liters methanol and are hydrogenated in the presence of 25 g. of a 5% palladium charcoal catalyst until the calculated amount of hydrogen has been taken up. After having been freed from the catalyst the solution is evaporated down and the residue recrystallised from 700 ml. ethyl acetate. The yield is 78–82 g. (78–82% of the theoretical) N - [1-(3'-tert.butyl-4'-hydroxy-5'-methylphenyl)-1-hydroxy-propyl-2]-N-methylamine. M.P. 170–171° C.

Maleate, M.P. 182–183° C.
Fumarate, M.P. 205–206° C.

In an analogous manner the compounds in the following table are obtained.

N-ethyl-N-benzylamine or N-benzyl-N-β-hydroxy-ethylamine in benzene:

α-(N-benzyl-N-methyl-amino)-3-tert.butyl-4-hydroxy-5-methyl-acetophenone, hydrochloride, M.P. 228° C.
α-(N-benzyl-N-methyl-amino)-3-tert.butyl-4-hydroxy-5-methyl-propiophenone, M.P. 133–135° C.
α-(N-benzyl-N-methyl-amino)-3-tert.butyl-4-hydroxy-5-methyl-butyrophenone, M.P. 110–112° C.
α-(N-benzyl-N-ethyl-amino)-3-tert.butyl-4-hydroxy-5-methyl-propiophenone, hydrochloride, M.P. 178° C.
α-(N-benzyl-N-β-hydroxyethylamino)-3-tert.butyl-4-hydroxy-5-methyl-propiophenone, M.P. 113–114° C.

The α-(N-benzyl-N-methyl-amino)-3-benzyl - oxy - 4-tert.butyl-acetophenone which is used in Example 3 can be produced as follows:

p-Tert.butyl-acetophenone is nitrated at −25° C. with a mixture of concentrated sulfuric acid and concentrated nitric acid (d.=1.42) to produce 4 - tert.butyl-3-nitro-acetophenone, B.P. 136–140° C. at 0.05 mm., which can be hydrogenated in methanol solution in the presence of a palladium-charcoal catalyst to produce 3-amino-4-tert.butyl-acetophenone, M.P. 73° C. (hydrochloride M.P. 183–185° C.). This is then diazotized and boiled to produce 4-tert.butyl-3-hydroxy-acetophenone of M.P. 127° C. from which 3-benzyloxy-4-tert.butyl-acetophenone, M.P. 62–64° C. is produced, the latter being brominated to α - bromo-3-benzyloxy-4-tert.butyl-acetophenone, M.P. 85° C. By reacting it with N-benzyl-N-methyl-amine it is converted into α-(N-benzyl-N-methyl-amino) - 3 - benzloxy - 4-tert.butyl-acetophenone, whose hydrochloride melts at 190–192° C.

| Example | Compound | M.P. of the hydrochloride, ° C. | Starting material |
|---|---|---|---|
| 2 | N-[1-(3'-tert.butyl-4'-hydroxy-5'-methyl-phenyl)-1-hydroxybutyl-2]-N-methyl-amine. | 184 | x-(N-benzyl-N-methyl-amino)-3-tert.butyl-4-hydroxy-5-methyl-butyrophenone. |
| 3 | N-[2-(4'-tert.butyl-3'-hydroxyphenyl)-2-hydroxy-ethyl]-N-methyl-amine. | 227–8 | x-(N-benzyl-N-methyl-amino)-3-benzyloxy-4-tert.butyl-acetophenone. |
| 4 | N-[2-(3'-tert.butyl-4'-hydroxy-5'-methyl-phenyl)-2-hydroxy-ethyl]-N-methyl-amine. | 164–5 | x-(N-benzyl-N-methyl-amino)-3-tert.butyl-4-hydroxy-5-methyl-aceto-phenone. |
| 5 | N-[1-(3'-tert.butyl-4'-hydroxy-5'-methyl-phenyl)-1-hydroxy-propyl-2-]-N-ethyl-amine. | 208–210 | x-(N-benzyl-N-ethyl-amino)-3-tert.butyl-4-hydroxy-5-methyl-propiophenone. |
| 6 | N-[1-(3'-tert.butyl-4'-hydroxy-5'-methyl-phenyl)-1-hydroxy-propyl-2]-N-(β-hydroxy-ethyl)-amine. | 118 | x-(N-benzyl-N-β-hydroxy-ethylamino)-3-tert.butyl-4-hydroxy-5-methyl-propiophenone. |

The substances which have been designated as starting materials can be subjected to hydrogenation while they are in the form of salts, e.g. hydrochloride, whereupon the corresponding salts or hydrochlorides will be obtained directly after the usual working up.

The starting materials used in Examples 1, 2, 4, 5 and 6 can be produced as follows: 2-methyl - 6 - tert.butyl-phenyl is reacted with the corresponding acid chloride or acid anhydride in the presence of AlCl₃, and the phenol ester then saponified to produce the 3-tert.butyl-4-hydroxy-5-methyl-acetophenone, -propionophenone and -butyrophenone, which are converted into the substituted α-bromo-ketones by the usual bromination in chloroform or benzene. From these the desired amino-ketones are obtained by reaction with N-methyl-N-benzylamine or

EXAMPLE 7

25.5 g. α - isopropylamino - 3 - tert.butyl-4-hydroxy-5-methyl-butyro-phenone-hydrochloride, M.P. 221–223° C., are dissolved in 700 ml. methanol and hydrogenated under 6 atm. at 60° C. in the presence of 10 g. palladium charcoal catalyst (5%) until the calculated amount of hydrogen has been taken up. The solution after being freed from the catalyst is evaporated down and the residue crystallized from 250 ml. absolute ethanol, yielding 24.2 g.=92.5% theoretical. For hastening the crystallization, ether is added until the solution becomes turbid. The yield is 21.2 g. (83% of the theoretical) N-[1-(3'-tert.butyl-4'-hydroxy-5'-methyl - phenyl) - 1 - hydroxy-butyl-2] - N-isopropyl-amine-hydrochloride, M.P. 205–207° C.

In an analogous manner the compounds in the following table are obtained:

| Example: | Compound | M.P. of the hydrochloride, ° C. | Starting material | M.P. of the hydrochloride, ° C. |
|---|---|---|---|---|
| 8 | N-[1-(3'-tert.butyl-4'-hydroxy-5'-methyl-phenyl)-1-hydroxy-propyl-2]-N-n-butyl-amine. | 230 | x-n-butylamino-3-tert.butyl-4-hydroxy-5-methyl-propiophenone. | 150 |
| 9 | N-[1-(3'-tert.butyl-4'-hydroxy-5'-methyl-phenyl)-1-hydroxy-propyl-2]-N-isopropyl-amine. | 209–211 | x-Isopropylamino-3-tert.butyl-4-hydroxy-5-methyl-propiophenone. | 238 |
| 10 | N-[2-(3'-tert.butyl-4'-hydroxy-5'-methyl-phenyl)-2-hydroxy-ethyl]-N-(4-phenyl-butyl-2)-amine. | 184–185 | x-[N-(4-phenyl-butyl-2)-amino]-3'-tert.butyl-4'-hydroxy-5'-methyl-acetophenone. | 212–214 |
| 11 | N-[1-(3'-tert.butyl-4'-hydroxy-5'-methyl-phenyl)-1-hydroxy-propyl-2]-N-(4-phenyl-butyl-2)-amine. | 198–200 | x-[N-(4-phenyl-butyl-2)-amino]-3'-tert.butyl-4'-hydroxy-4'-methyl-propiophenone. | 216–218 |
| 12 | N-[2-(4'-tert.butyl-3'-hydroxy-phenyl)-2-hydroxy-ethyl]-N-Iso-propyl-amine. | 137–139 | x-Isorpopylamino-3-benzyloxy-4-tert.butyl-acetophenone. | 236–238 |
| 13 | N-[2-(4'-tert.butyl-3'-hydroxy-phenyl)-2-hydroxy-ethyl]-N-(4-phenyl-butyl-2) amine. | 217–219 | x-[N-(4-phenyl-butyl-2)-amino]-3'-benzyloxy-4'-ter.butyl-acetophenone. | 187–190 |
| 14 | N-[2-(3'-tert.butyl-4'-hydroxy-5'-methyl-phenyl)-2-hydroxy-ethyl]-N-isopropyl-amine. | 181–182 | x-Isopropylamino-3-tert.butyl-4-hydroxy-5-methyl-acetophenone. | 219–221 |

The amino-ketones which are used as starting materials in Examples 7 to 14 can be obtained from the corresponding bromo-ketones by the method described above.

EXAMPLE 15

5.8 g. α-isopropylamino-3-tert.butyl-4-hydroxy-5-methyl-butyrophenone are dissolved in 60 ml. methanol and are hydrogenated to completion under 80 atm. at 40–50° C. in the presence of 3 g. Raney-nickel moistened with methanol. The solution is then filtered and the solvent distilled off. The N-[1-(3'-tert.butyl-4'-hydroxy-5'-methyl - phenyl) - 1-hydroxybutyl-2]-N-isopropyl-amine thus obtained is converted into the hydrochloride in the usual manner, which after recrystallization from absolute ethanol with a little added ether, melts at 210° C. (4.1 g.=62% of the theoretical).

EXAMPLE 16

3.0 g. α-n-butylamino-3-tert.butyl-4-hydroxy-5-methyl-propionophenone are treated with hydrogen as in Example 15 and are then worked up in a similar manner. The yield is 2.2 g. (67% theoretical) N-[1-(3'-tert.butyl-4'-hydroxy - 5' - methyl-phenyl)-1-hydroxy-propyl-2]-N-n-butyl-amine-hydrochloride. M.P. 228° C. with decomposition.

EXAMPLE 17

A solution of 5.3 g. α-benzylamino-3-tert.butyl-4-hydroxy-5-methyl-butyrophenone in 1000 ml. dry ether is added with stirring and cooling to 4.8 g. lithium tetrahydrogenaluminate under 100 ml. ether. The mixture is then heated one hour under reflux, cooled to room temperature, and then after being treated with moist ether is reacted with 300 ml. 12% hydrochloric acid. After working it up in the usual manner the yield is 4.3 g. (81% theoretical) N - [1 - (3'-tert.butyl-4'-hydroxy-5'-methyl-phenyl) - 1-hydroxy-butyl-2]-N-benzylamine. M.P. 173–175° C.

EXAMPLE 18

13.6 g. (0.04 mole) α-(N-benzyl-N-methyl-amino)-3-tert.butyl-4-hydroxy-5-methyl-propionophenone are dissolved in 300 ml. methanol and hydrogenated in the presence of 7 g. palladium-charcoal catalyst (5%) until 0.04 mol hydrogen has been taken up. The solution is freed from the catalyst and is then evaporated down under reduced pressure. The residue is recrystallized from ethyl acetate and consists of α-N-methylamino-3-tert.butyl-4-hydroxy-5-methyl-propiophenone. M.P. 137–139° C.

5.0 g. of this amino-ketone are dissolved in 150 ml. dry ether and added drop-by-drop to 1.5 g. lithium tetrahydrogen aluminate under 20 ml. dry ether. The mixture is then heated one hour under reflux, cooled to room temperature, and reacted with water and ammonia. The ether phase is separated, the aqueous phase extracted several times with ether, and the combined extracts dried over sodium sulfate. After evaportion of the solvent and recrystallization from ethyl acetate the product is N-[1-(3' - tert.butyl - 4'-hydroxy-5'-methyl-phenyl)-1-hydroxy-propyl-2]-N-methyl-amine. M.P. 169–171° C.

EXAMPLE 19

4.4 g. 1-(3'-tert.butyl-4'-propionyloxy-5'-methyl-phenyl)-1-hydroxy-2-methyl-amino-propane-hydrochloride dissolved in a mixture of 45 ml. glacial acetic acid, 24 ml. concentrated hydrochloric acid and 14 ml. water and the mixture heated 20 hours under reflux. The solution is evaporated down under reduced pressure, extracted with ether, and dilute NaOH added until the pH reaches about 7.5. The precipitate is taken up in ethyl acetate, the solution dried over sodium sulfate, and after evaporation of the solvent the N-[1-(3'-tert.butyl-4'-hydroxy-5' - methyl - phenyl) - 1-hydroxy propyl-2]-N-methyl-amine thus obtained is recrystallized from ethyl acetate. M.P. 169–171° C.

The starting material consisting of 1-(3'-tert.butyl-4'-propionyloxy - 5' - methyl-phenyl)-1-hydroxy-2-methyl-amino-propane-hydrochloride can be obtained as follows:

3 - tert.butyl - 4 - propionyloxy-5-methyl-propionophenone (M.P. 90° C.) is converted into α-bromo-3-tert.butyl-4-propionyloxy-5-methyl-propionophenone by the used bromination with bromine in chloroform. After reacting it with N-benzyl-N-methylamine the product is α-(N - benzyl - N - methylamino)-3-tert.butyl-4-propionyloxy - 5 - methyl-propionophenone, whose hydrochloride melts at 195–197° C. It is hydrogenated in the presence of a palladium charcoal catalyst to produce the desired 1-(3' - tert.butyl - 4'-propionyloxy-5'-methyl-phenyl)-1-hydroxy - 2 - methyl-amino-propane, whose hydrochloride melts at 228–230° C.

EXAMPLE 20

3.53 g. α-(N-benzyl-N-methylamino)-3-tert.amyl-4-hydroxy-5-methyl-propiophenone are dissolved in 100 ml. ethanol and hydrogenated in the presence of 0.5 g. palladium charcoal (5%) under 6 atm. until the calculated amount of hydrogen has been taken up. The solution after being freed from the catalyst is evaporated down under reduced pressure and the residue recrystallized from ethyl acetate. The product is N-[1-(3'-tert.amyl-4'-hydroxy-5'-methyl - phenyl) - 1 - hydroxy-propyl-2]-Nmethylamine which melts at 159–161° C.

By analogy to the above described α-(N-benzyl-N-methyl - amino)-3-tert.butyl-4-hydroxy-5-methyl-propiophenone, the starting material can be produced from 2-tert. amyl-6-methylphenol by reaction of p-bromo-o-cresol with tert. amyl alcohol or amylene in the presence of concentrated sulfuric acid, followed by reductive removal of the bromine by a palladium-magnesium-oxide catalyst. The α-(N-benzyl-N-methylamino)-3-tert.amyl-4-hydroxy-5-methyl-propiophenone melts at 106–108° C.

EXAMPLE 21

4.5 g. α - methylamino - 4-tert.butyl-3-hydroxy-2,6-dimethyl-acetophenone are dissolved in 50 ml. tetrahydrofuran and without any external cooling are added dropwise with stirring to a suspension of 0.85 g. lithium tetrahydrogen aluminate in 50 ml. tetrahydrofuran. The reaction mixture is boiled 6 hours under reflux, then cooled, mixed with moist tetrahydrofuran, poured upon ice water, and acidified with a 16% solution of sulfuric acid. Neutral products are removed by extraction with ether. The acid aqueous phase is mixed with 10 g. tartaric acid and the mixture stirred into a large excess of ice cold concentrated soda lye. The base is extracted with ether and converted into the hydrochloride by hydrochloric acid and ether. By recrystallizing the hydrochoride from ethanol, a small amount of the starting material is obtained as the first crystalline product. After concentration of the mother liquor, the N-[2-(4'-tert.butyl-3'-hydroxy - 2',6'-dimethyl-phenyl)-2-hydroxy-ethyl]-N-methyl-amine-hydrochloride is obtained which after recrystallization from ethanol melts at 220–222° C. with decomposition. Its IR spectrum no longer exhibits any keto-bands.

The above mentioned starting material can be produced in the following manner: 4-tert.butyl-3-hydroxy-2,6-dimethylbenzyl chloride has its phenolic hydroxyl group acetylated, saponified and benzylated to convert this compound into 3 - benzyloxy-4-tert.butyl-2,6-dimethyl-benzyl-alcohol. This can be oxidized by means of tert. butyl chromate to the corresponding substituted benzaldehyde which is then converted into the 3-benzyloxy-4-tert.butyl-2,6-dimethyl-acetophenone by reaction with methyl-magnesium iodide and subsequent oxidation. By hydrogenolytic debenzylation with subsequent bromination, the α-bromo - 4 - tert.butyl-3-hydroxy-2,6-dimethyl-acetophenone is obtained which is then reacted with benzyl-methylamine. By hydrogenolytic debenzylation the α-methylamino - 4-tert.butyl-3-hydroxy-2,6-dimethyl-acetophenone is obtained. M.P. 144–146° C. Its hydrochloride after sintering and discoloration melts at 256° C. with decomposition.

EXAMPLE 22

By an analogous reaction α-ethyl-amino-4-tert.butyl-3-hydroxy-2,6-dimethyl-acetophenone is reduced with lithium-tetrahydrogen-aluminate to produce the N-[2-(4'-tert.-butyl-3'-hydroxy - 2',6'-dimethyl-phenyl)-2-hydroxy-ethyl]-N-ethylamine. The crude hydrochloride which is produced in the usual manner is recrystallized from ethanol. As in the previous example, some of the starting material is regained during the first crystallization, but during the second crystallization the desired end product is obtained. M.P. 202–203° C. Its IR spectrum no longer has any keto-bands.

The starting material is obtained by reaction of α-bromo-4-tert.-butyl-3-hydroxy - 2,6 - dimethyl-acetophenone with ethyl-benzylamine and hydrogenolytic debenzylation of the product. The hydrochloride melts at 220–222° C. with previous sintering and discoloration.

EXAMPLE 23

By an analogous reaction α-isopropyl-amino-4-tert-butyl-3-hydroxy-2,6-dimethyl-ethyl-acetophenone is reduced with lithium-tetrahydrogen aluminate to produce N-[2-(4'-tert.-butyl-3'-hydroxy-2',6'-dimethyl-phenyl) - 2 - hydroxy-ethyl]-N-isopropyl-amine. The crude hydrochloride which is produced in the usual manner is recrystalized from ethanol/ether. M.P. 203°.

The starting material is obtained by reaction of α-bromo-4-tert.butyl-3-hydroxy - 2,6 - dimethyl-acetophenone with isopropyl-benzylamine and hydrogenolytic debenzylation of the product.

EXAMPLE 24

5.5 g. 1-(4'-tert.-butyl-3'-hydroxy-2',6'-dimethylphenyl)-1-hydroxy-propyl-2-amine and 1.3 g. acetone are boiled in 75 ml. toluene 2 hours under reflux. 1.3 g. acetone are then added and the mixture boiled another 3 hours. A little water collects in the water separator. The toluene is distilled off under vacuum and the residue is hydrogenated with 1 g. platinum oxide in 150 ml. methanol under normal pressure and room temperature. The catalyst is filtered off, the solution concentrated and the residue converted into the hydrochloride with ether and hydrochloric acid. After recrystallization from alcohol/ether the yield is 3.5 g. N-[1-(4'-tert.butyl-3'-hydroxy-2', 6' - dimethyl-phenyl)-1-hydroxy-propyl-2]-N-isopropyl-amine hydrochloride. M.P. 227–229° with decomposition.

The starting material is produced by reaction of 3-benzyloxy-4-tert.butyl-2,6' - dimethylbenzaldehyde with ethyl magnesium bromide, oxidation by chromic acid to the ketone, hydrogenolytic debenzylation, bromination and reaction with benzylamine to substituted α-benzyl-aminopropiophenone, another hydrogenolytic debenzylation, followed by hydrogenation with a Raney nickel catalyst. The hydrochloride melts at 233–235° C. with decomposition.

EXAMPLE 25

3.47 ω - benzylamino-3-tert.butyl-4-hydroxy-5-methyl-acetophenone-hydrochloride are dissolved in 100 ml. methanol and hydrogenated to completion under normal conditions in the presence of 2 g. palladium charcoal catalyst (5%). The solution is freed from the catalyst and is evaporated down under reduced pressure. The residue is dissolved in a small amount of absolute alcohol and recrystallized from ether, producing 2.0 g. 2-(3'-tert.butyl-4'-hydroxy-5'-methyl-phenyl) - 2 - hydroxy-ethylamine-hydrochloride. M.P. 195° C.

The ω - benzylamino-3-tert.butyl-4-hydroxy-5-methyl-acetophenone-hydrochloride which was used as the starting material can be obtained in the following manner:

2-methyl-6-tert.butyl-phenol is converted into 3-tert.butyl-4-hydroxy-5-methyl-acetophenone. (M.P. 123–125° C.) by treatment with $AlCl_3$, acetylchloride or acetic anhydride and subsequent saponification of the phenol ester (B.P. 125–130° C. at 0.05 mm.). The product is then converted into ω-bromo-3-tert.butyl-4-hydroxy-5-methyl-acetophenone. (M.P. 95–97° C.) by the usual bromination with bromine in chloroform or benzene. The material is then reacted with benzylamine in benzene to obtain the desired ω-benzylamino-3-tert.butyl-4-hydroxy-5-methyl-acetophenone which is converted in the usual manner into the hydrochloride which melts at 240° C.

EXAMPLE 26

3.6 g. ω-benzylamino-3-tert.butyl-4-hydroxy-5-methyl-propionophenone-hydrochloride are dissolved in 50 ml. absolute alcohol and hydrogenated at 60° C. under 6 atm. until the calculated amount of hydrogen is taken up. The mixture is filtered to remove the catalyst and the filtrate evaporated down. The residue is recrystallized from absolute alcohol, producing 1.9 g. 1-(3'-tert.butyl-4'-hydroxy-5'-methyl-phenyl)-1-hydroxy - 2 - amino-propane-hydrochloride. M.P. 210° C.

The starting material consisting of ω-benzylamino-3-tert.butyl-4-hydroxy-5-methyl-propionophenone - hydrochloride can be produced from 3-tert.butyl-4-propionyloxy-5-methyl-propionophenone, M.P. 90° C. by analogy to Example 1. It melts at 208–210° C.

EXAMPLE 27

α-Amino-4-tert.butyl-3-hydroxy-2,6-dimethyl - acetophenone-hydrochloride is hydrogenated to completion in 55 ml. methanol with 10 g. Raney nickel at about 65° C and under 100 atm. The catalyst is filtered off with suction, the methanol distilled off, and the residue recrystallized from alcohol and ether. The yield is 4.5 g. 2-(4'-tert.butyl-3'-hydroxy-2',6'-dimethyl-phenyl)-2-hydroxy - ethylamine-hydrochloride. M.P. 217–218° C.

The above-mentioned starting material is obtained from 4-tert.butyl-3-hydroxy - 2,6 - dimethyl-acetophenone by bromination in chloroform, reaction of the bromo-ketone with benzylamine, conversion into the hydrochloride, and removal of the benzyl group by hydrogenation with palladium charcoal in methanol. After recrystallization from isopropyl alcohol the product melts at 228–229° C.

EXAMPLE 28

3.76 g. α-benzylamino-4-tert.butyl-3-hydroxy-2,6-dimethyl-propionophenone-hydrochloride are hydrogenated with 3 g. 5% palladium charcoal in 200 ml. methanol under 6 atm. and at about 60° C. The mixture is then filtered and the filtrate after being concentrated is further hydrogenated under 100 atm. and at 100° C. with 5 g. Raney nickel. During the first hydrogenation stage the benzyl group is removed while during the second stage the keto group is reduced. After filtration and concentration the acidified solution is extracted with ether and after being made alkaline is again extracted to remove the neutral and basic products. The latter are converted into their hydrochlorides and are then recrystallized from ethyl acetate. The yield is 1.2 g. 1-(4'-tert.butyl-3'-hydroxy-2',6'-dimethyl-phenyl)-1-hydroxy - 2 - amino-propane-hydrochloride, melting at 232–233° C. with decomposition.

The starting material is obtained from 4-tert.butyl-3-hydroxy-2,6-dimethyl-propionophenone by bromination and reaction with benzylamine. After recrystallization from alcohol and ether, it melts at 187–188° C.

EXAMPLE 29

10 g. α-isonitroso - 3 - tert.butyl-4-hydroxy-5-methyl-propionophenone are dissolved in 150 ml. dry ether and with vigorous stirring are added dropwise to a suspension of 3.9 g. lithium aluminum hydride in 100 ml. dry ether. The mixture is then heated 2 hours under reflux, cooled to room temperature, and mixed first with moist ether and then with water. The ether is separated and the aqueous phase again extracted with the same solvent. The combined ether extracts are dried over sodium sulfate and concentrated. The base thus obtained is converted in the usual manner into the 1-(3'-tert.butyl-4'-hydroxy-5'-methyl-phenyl) - 1 - hydroxy - 2 - amino-propane-hydrochloride. M.P. 210° C.

The starting material consisting of α-isonitroso-3-tert.butyl-4-hydroxy - 5 - methyl-propionophenone can be produced as follows:

A solution of 39 g. 3-tert.butyl-4-hydroxy-5-methyl propionophenone in 500 ml. ether is heated to boiling while a current of dry HCl and methyl nitrite is passed into it, the latter being obtained from a solution of 14.5 g. 95% sodium nitrite in 9 ml. methanol and 8.5 ml. water with the addition of half concentrated sulfuric acid. After being cooled to room temperature the mixture is extracted six times with 25 ml. of a 10% soda lye solution. The alkaline extracts are poured upon 50 g. ice and 35 ml. concentrated hydrochloric acid and the precipitated reaction product taken up with ether. The ether solution is dried over sodium sulfate and the solvent evaporated. The yield is 37 g. of the crude product, which is recrystallized from 100 ml. ethyl acetate and 50 ml. petroleum ether (B.P. 50–70° C.) to produce 19 g. of the pure α-isonitroso-3-tert.butyl-4-hydroxy-5-methyl-propionophenone. M.P. 163–165° C.

EXAMPLE 30

4.98 g. α-isonitroso - 3 - tert.butyl-4-hydroxy-5-methyl-propionophenone are dissolved in 200 ml. 2 N-soda lye and after the addition of 4 g. water moistened Raney nickel and 130 ml. water are hydrogenated under 6 atm. at room temperature to completion. The solution after being freed from the catalyst is concentrated to about 80 ml., is brought to a pH of about 7.5 with 2 N-hydrochloric acid, and extracted with ether to take up the base. After being dried with solvent is evaporated, leaving 3.0 g. crude 1-(3' - tert.butyl - 4' - hydroxy-5'-methyl-phenyl)-1-hydroxy-2-amino-propane which is converted by the usual method into its hydrochloride, melting at 210° C.

EXAMPLE 31

8.2 g. ω-azido-(3-tert.butyl-4-hydroxy-5-methyl)-acetophenone are dissolved in 200 ml. methanol and hydrogenated under 6 atm. at 60° C. in the presence of 5 g. palladium charcoal catalyst (5%) and 5 ml. concentrated hydrochloric acid (d.=1.19) with continuous analysis and flushing until completion. After separation of the catalyst, the solution is concentrated under reduced pressure and the resultant viscous liquid dissolved in 20 ml. absolute alcohol and mixed with ether until the turbidity point is reached. The yield is 4.8 g. 2-(3'-tert.butyl-4'-hydroxy - 5' - methyl-phenyl)-2-hydroxy-ethylamine-hydrochloride, M.P. 195–197° C.

If the hydrogenation is stopped after 1 mol hydrogen has been taken up, the intermediate product consisting of ω-amino - 3 - tert.butyl-4-hydroxy-5-methyl-acetophenone-hydrochloride is obtained. M.P. 255–256° C.

The starting material consisting of ω-azido-(3-tert.butyl-4-hydroxy-5-methyl)-acetophenone can be obtained as follows:

A solution of 30 g. ω-bromo-3-tert.butyl-4-hydroxy-5 methyl-acetophenone (M.P. 95–97° C.) in 90 ml. absolute alcohol is reacted with a solution of 6.6 g. sodium azide in 30 ml. water and kept over night at room temperature. The azide which has crystallized out is filtered off with suction and recrystallized from ethyl acetate and petroleum ether. M.P. 107–109° C.

By analogy, the α-azido-3-tert.butyl-4-hydroxy-5-methyl-propiophenone, M.P. 69–72° C., can be obtained.

EXAMPLE 32

5.05 g. ω-azido-3-benzyloxy-4-tert.butyl-acetophenone are hydrogenated and worked up as in Example 7, producing 2-(4'-tert.butyl - 3' - hydroxy-phenyl)-2-hydroxy-ethylamine-hydrochloride. M.P. 210–212° C. (alcohol/ether).

The starting material can be produced as follows—p-tert.butyl-acetophenone is nitrated at −25° C. with a mixture of concentrated sulfuric acid and concentrated

19 nitric acid (d.=1.42), producing 4-tert.butyl-3-nitro-acetophenone (B.P. 136–140° C. at 0.05 mm. Hg). When it is dissolved in the presence of a palladium charcoal catalyst, it can be hydrogenated to 3-amino-4-tert.butyl-acetophenone. The latter can then be diazotized and boiled to produce 4-tert.butyl-3-hydroxy-acetophenone (M.P. 127° C.) from which the 3-benzyloxy-4-tert.butyl-acetophenone can be obtained which can then be brominated to produce ω-bromo-3-benzyloxy - 4 - tert.butyl-acetophenone, M.P. 85° C., and then reacted with sodium azide to produce ω-azido-3-benzyloxy-4-tert.butyl-aceto-phenone. M.P. 87° C.

EXAMPLE 33

30.1 g. 1 - (3'-tert.butyl-4'-hydroxy-5'-methylphenyl)-2-bromo-propane-1-ol and 50 g. methylamine are stirred for 8 hours in a bomb tube at room temperature and subsequently for 10 hours at 110° C. The reaction mixture is cooled, the excess of methylamine is evaporated and the residue is treated with dilute HCl (10%) until a slight acidic reaction. The undissolved is filtered off, the filtrate extracted with ether and the aqueous layer is made alkaline by addition of NaOH and extracted with ethylacetate. After drying and evaporating the solvent, the crude N-[1-(3'-tert.butyl-4'-hydroxy-5'-methyl-phenyl)-1-hydroxy-propyl-2]-N-methylamine is recrystallized from ethylacetate. M.P. 168–171° C.

The starting material may be prepared in the following way:

3-tert.butyl - 4 - hydroxy - 5 - methyl-propiophenone is hydrogenated catalytically in the presence of palladium charcoal to form (3-tert.butyl-4-hydroxy-5-methylphenyl)-ethyl-carbinol which is dehydrated with oxalic acid to prepare 1-(3'-tert.butyl - 4' - hydroxy - 5' - methyl-phenyl)-propene-1. 1-(3' - tert.butyl - 4' - hydroxy - 5'-methylphenyl)-2-bromo-propane-1-ol is obtained by adding hypobromide to the double bond.

In analogy, the following compounds may be obtained when using the corresponding amines:

N-[1-(3'-tert.butyl-4'-hydroxy-5'-methylphenyl)-1-hydroxy-propyl-2]-N-isopropyl amine
N-[1-(3'-tert.butyl-4'-hydroxy-5'-methylphenyl)-1-hydroxy-propyl-2]-N-[2''-phenylethyl]-amine.

EXAMPLE 34

44.2 g. α-(3-tert.butyl-4-hydroxy-5-methylphenyl)propylenoxide are dissolved in 500 ml. of a 15% alcoholic methylamine solution and stirred for 8 hours in a bomb tube at 120–130° C. Upon cooling, the excess of methylamine and of the solvent is evaporated. The residue is acidified with HCl and extracted with ether. The aqueous layer is made alkaline with NaOH and extracted with ethylacetate. The mixture obtained by drying and evaporating the solvent is recrystallized from ethylacetate. N-[1-(3'-tert.butyl-4'-hydroxy - 5' - methylphenyl)-1-hydroxy-propyl-2]-N-methylamine has an M.P. of 168–170° C.

The starting material may be prepared from 1-(3'-tert.-butyl-4'-hydroxy - 5' - methylphenyl)-2-bromo-propane-1-ol by treatment with NaOH.

EXAMPLE 35

8.5 g. 1-(3'-tert.butyl-4'-propionyloxy - 5' - methyl-phenyl)-1-hydroxy-2-methylamino-propane and 0.5 g. sodium ethylate are dissolved in 100 ml. ethanol and the solution is refluxed for 48 hours. The mixture is evaporated to dryness, the residue is treated with 80 ml. water and extracted with ethyl acetate. The solution is dried over sodium sulfate and the obtained base is recrystallized from ethyl acetate. N-[1-(3'-tert.butyl-4'-hydroxy-5'-methylphenyl)-1-hydroxypropyl-2]-N-methylamine has an M.P. of 168–170° C.

What is claimed is:
1. A member selected from the group consisting of a compound and a physiologically compatible, non-toxic acid addition salt thereof, said compound being of the formula

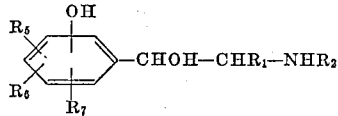

wherein
$R_1$ is selected from the group consisting of hydrogen and alkyl of 1–4 carbon atoms;
$R_2$ is selected from the group consisting of hydrogen, alkyl of 1–6 carbon atoms, hydroxyalkyl of 2–3 carbon atoms, phenoxyalkyl of 7–11 carbon atoms, and a radical of the formula

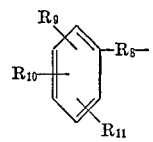

wherein
$R_8$ represents alkyl of 1–5 carbon atoms;
$R_9$, $R_{10}$ and $R_{11}$ are each selected from the group consisting of hydrogen, hydroxy, methoxy, ethoxy, and two of $R_9$, $R_{10}$ and $R_{11}$ forming methylene dioxy;
$R_5$ represents tertiary alkyl of 4–6 carbon atoms; and
$R_6$ and $R_7$ are each selected from the group consisting of hydrogen, methyl and ethyl, and with the provision that when both $R_6$ and $R_7$ are hydrogen, the phenolic hydroxy group is in other than the 4'-position.

2. A member as defined by claim 1 with the further provision that when both $R_6$ and $R_7$ are hydrogen, the phenolic hydroxy group is in the 3'-position.

3. A member as defined by claim 1 with the provision that at least one of $R_6$ and $R_7$ is other than hydrogen.

4. A member as defined by claim 1 wherein the phenolic hydroxy group is in the 4'-position, $R_5$ is 3'-tert. butyl, and one of the $R_6$ and $R_7$ represents 5'-methyl.

5. N-[1-(3'-tert.butyl - 4' - hydroxy-5'-methyl-phenyl)-1-hydroxy-butyl-2]-N-isopropylamine.

6. N-[1-(3'-tert.butyl-4'-hydroxy - 5' - methyl-phenyl)-1-hydroxy-propyl-2]-N-methylamine.

7. N-[1-(3'-tert.butyl - 4' - hydroxy-5'-methyl-phenyl)-1-hydroxy-propyl-2]-N-ethylamine.

8. N-[1-(3'-tert.butyl-4'-hydroxy - 5' - methyl-phenyl)-1-hydroxy-propyl-2]-N-isopropylamine.

9. N-[1-(3'-tert.butyl - 4' - hydroxy-5'-methyl-phenyl)-1-hydroxy-propyl-2]-N-(4-phenyl-butyl-2)-amine.

10. N-[1-(3'-tert.butyl-4'-hydroxy - 5'-methyl-phenyl)-1-hydroxy-propyl-2]-N-(1-phenoxy-propyl-2)-amine.

11. N-[2-(3'-tert.butyl - 4'-hydroxy-5'-methyl-phenyl)-2-hydroxy-ethyl]-N-methylamine.

12. N-[2-(3'-tert.butyl-4'-hydroxy - 5'-methyl-phenyl)-2-hydroxy-ethyl]-N-isopropylamine.

13. N-[2-(3'-tert.butyl - 4'-hydroxy-5'-methyl-phenyl)-2-hydroxy-ethyl]-N-(4-phenyl-butyl-2)-amine.

14. N-[2-(3'-tert.butyl-4'-hydroxy - 5'-methyl-phenyl)-2-hydroxy-ethyl]-N-(1-phenoxy-propyl-2)-amine.

15. N-[1-(4'-tert.butyl-3'-hydroxy - phenyl)-1-hydroxy-propyl-2]-N-methylamine.

16. N-[1-(4'-tert.butyl-3' - hydroxy-phenyl)-1-hydroxy-propyl-2]-N-isopropylamine.

17. N-[2-(4'-tert.butyl-3' - hydroxy - 2',6' - dimethyl-phenyl)-2-hydroxy-ethyl]-N-methylamine.

18. N-[1-(4'-tert.butyl - 3' - hydroxy - 2',6'-dimethyl-phenyl)-1-hydroxy-propyl-2]-N-methylamine.

19. N-[2-(4'-tert.butyl-3' - hydroxy - 2',6' - dimethyl-phenyl)-2-hydroxy-ethyl]-N-isopropylamine.

20. N-[1-(4' - tert.butyl - 3' - hydroxy-2',6'-dimethyl-phenyl)-1-hydroxy-propyl-2]-N-isopropylamine.

21. 2-(3'-tert.butyl - 4' - hydroxy-5'-methyl-phenyl)-2-hydroxy-ethylamine.
22. 1-(3'-tert.butyl-4'-hydroxy - 5' - methyl-phenyl)-1-hydroxy-2-aminopropane.

References Cited

UNITED STATES PATENTS

| 3,202,711 | 8/1965 | Fruhstorfer et al. | 260—570.6 |
|---|---|---|---|
| 2,538,792 | 1/1951 | Moersch | 260—570.6 |
| 3,184,510 | 1/1965 | Levy | 260—570.6 |
| 3,072,530 | 1/1963 | Hoffman | 167—65 |
| 3,098,010 | 7/1963 | Everett | 167—65 |

OTHER REFERENCES

Steinberg et al.: Journal Organic Chemistry, vol. 13, pp. 413–20 (1948).

Moed et al.: Rec. Trav. Chim., vol. 71, pp. 933–44 (1952).

ROBERT V. HINES, Primary Examiner

U.S. Cl. X.R.

260—144, 239, 326, 343, 348, 349, 453, 465, 471, 482, 483, 488, 501, 556, 559, 561, 562, 566, 567, 569, 570, 580, 592, 600, 613, 618, 622, 623, 624, 625, 626, 668; 424—330